Figure 1:
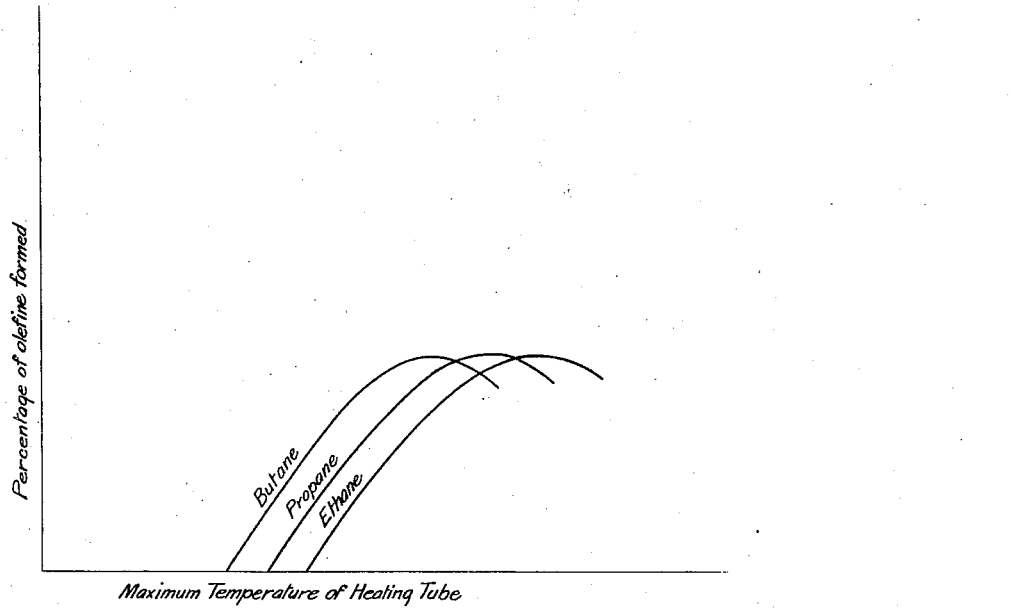

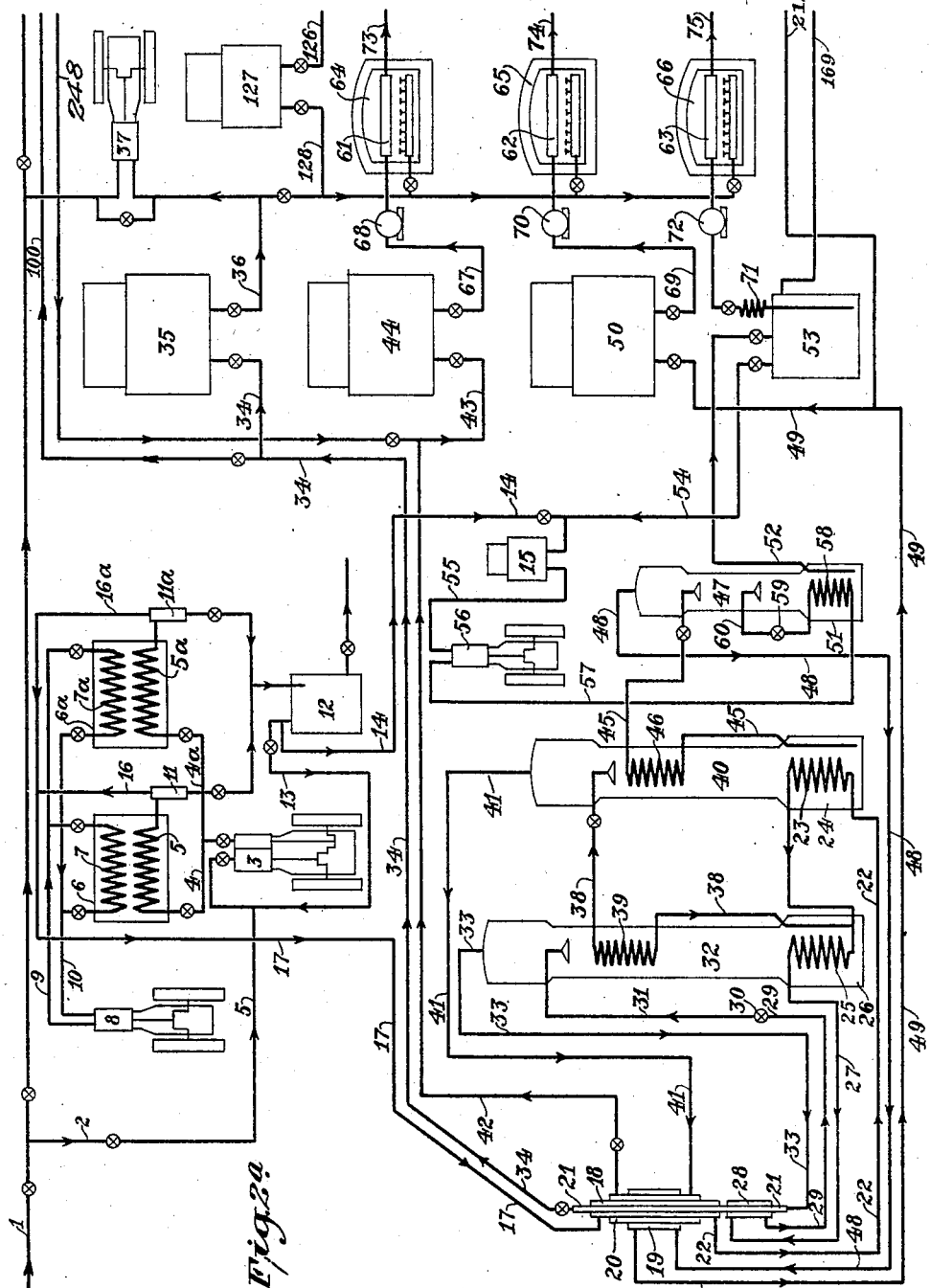

Fig. 2b.

Patented Jan. 27, 1925.

1,524,355

UNITED STATES PATENT OFFICE.

PIERRE E. HAYNES, OF BUFFALO, NEW YORK, AND GEORGE O. CURME, JR., OF PITTSBURGH, PENNSYLVANIA, ASSIGNORS, BY MESNE ASSIGNMENTS, TO CARBIDE AND CARBON CHEMICALS CORPORATION, A CORPORATION OF NEW YORK.

PROCESS OF MAKING OLEFINES.

Application filed March 8, 1920. Serial No. 364,261.

*To all whom it may concern:*

Be it known that we, PIERRE E. HAYNES and GEORGE O. CURME, Jr., citizens of the United States, residing at (1) Buffalo and (2) Pittsburgh, in the counties of (1) Erie and (2) Allegheny and States of (1) New York and (2) Pennsylvania, have invented certain new and useful Improvements in Processes of Making Olefines, of which the following is a specification.

Natural gas, as is well known, is a variable mixture composed chiefly of hydrocarbons of the paraffin or $C_nH_{2n+2}$ series. There may be present, for example, methane, ethane, propane, butane, pentane, and hexane of this series. Other substances besides paraffin hydrocarbons and usually regarded as impurities, may also be present. Of this latter class, water, carbon dioxide and hydrogen sulfid may be mentioned.

The object of the present invention is to produce olefine hydrocarbons from the paraffins higher than methane which are contained in natural gas or like mixtures. The final product of the process may be a mixture of a particular olefine with non-olefines, a mixture of two or more olefines with or without other substances, or a single olefine in substantially pure form. The olefines are substances of high chemical reactivity and, therefore, useful in the synthesis of many other compounds. Olefines and mixtures containing them are also valuable as cutting and welding gases.

On suitably heating a gaseous paraffin hydrocarbon having two or more carbon atoms in the molecule, the paraffin molecule is decomposed, the principal reactions being illustrated by the following equations:

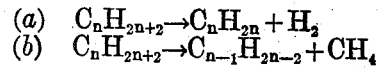

(a) $C_nH_{2n+2} \rightarrow C_nH_{2n} + H_2$
(b) $C_nH_{2n+2} \rightarrow C_{n-1}H_{2n-2} + CH_4$ Depending on the paraffin heated and the conditions of heating, the yield of the olefine having the same number of carbon atoms as the paraffin taken may be either greater or less than the yield of the olefine having one less carbon atom. Both reactions are characterized by the fact that the olefine produced is equal in volume to the paraffin heated, but since each reaction produces a volume of by-product (hydrogen or methane) equal to the olefine formed, the theoretical yield of olefine, according to either equation, would be 50% by volume of the gas mixture formed.

This theoretical yield of 50% cannot be attained in practice. When the temperature to which the paraffin is heated is low, a large proportion of the paraffin will escape decomposition of any kind, while if the temperature is unduly increased, much of the paraffin is converted into substances which are not olefines, or the olefines initially formed are converted into other substances. Between these extremes of temperature, there exists an optimum temperature for each paraffin at which temperature a maximum yield of olefines is obtainable from the paraffin. Similar considerations apply to the period of time during which the paraffin is subjected to elevated temperatures, an insufficient time resulting in too much unchanged paraffin, and too long a time resulting in an excessive amount of products formed by reactions other than those represented by the equations above. It is found in practice that in order to secure the maximum yield of olefines, the time of heating must be so limited that some of the paraffin treated passes through the reaction vessel unchanged.

The optimum conditions for heat-treating any particular paraffin vary somewhat with the apparatus employed and can be best determined by experiment. Good results have been obtained by heating ethane to 800° C. for a period usually considerably less than 60 seconds. The optimum temperature for decomposing propane is found to lie 50°–100° C. below that for ethane and the optimum temperature for butane is lower than that for propane by a similar decrement. Whatever exact temperature and time is found best suited for a particular paraffin in a particular apparatus, this temperature will prove materially too high for the next higher homologous paraffin.

We have discovered that when a mixture of paraffin hydrocarbons, such as natural gas, is to be used for the production of olefines by heating, the yield from a given quantity of the mixture can be much increased by first separating the individual paraffins and then heating the paraffins so isolated, each under its particular optimum conditions.

In other words, there are no conditions under which the mixture may be heated, which will produce a yield of olefines as high as is obtainable by first resolving the mixture into its components and then treating each isolated component paraffin under its own optimum conditions.

As already indicated, the products obtained on heating include, especially when paraffins standing above ethane in the series are treated, some or all of the paraffins and olefines having a lesser number of carbon atoms than the paraffin operated on. If the process is worked with the object of obtaining one or more isolated olefines, it is necessary to separate each olefine from the others and from the paraffins, hydrogen, etc., while if a mixture of pure olefines is desired, it is necessary to eliminate the paraffins, hydrogen, etc. In either case, it may be desirable to return the paraffins to the heat-treating process, and in accordance with the principles already outlined, it is advantageous to isolate the individual paraffins for subsequent heat-treatment. When, therefore, a mixture of paraffins is to be utilized for the production of olefines in pure form by isolating the constituent paraffins and heating them in separate furnaces, the various separations of heat-treated gas mixtures which must be made can be advantageously effected by combining the output of all the furnaces and subjecting the mixture so obtained to appropriate methods of separation. A decided economy will be achieved in this way as the losses due to the duplication of apparatus involved by performing a separate set of separations on the product of each furnace are thus avoided. The use of a single separating plant instead of a number of plants of smaller size results in a large saving in first cost and a further large saving on the items of attendance and power-losses due to radiation of heat.

The following example will illustrate a process within our invention in which ethane, propane and butane are first isolated from a gas mixture, each of the above paraffins is separately heat-treated, the products of the several heat treatments are combined, ethane and higher paraffins isolated therefrom and returned to the heat-treating step, and the several olefines are each isolated from the mixture of reaction products in substantially pure form. In all cases, it is usually advisable to subject the gas to a preliminary treatment to remove impurities, since those of high freezing point, for example water, might congeal and clog the apparatus, while others, such as hydrogen sulfid, may give rise to corrosive products, capable of attacking the apparatus. The removal of such substances forms no part of our invention and is effected by well-known processes and apparatus and therefore need not be described herein.

According to our invention, the separation of the several paraffins before heat-treatment is carried out in a series of steps involving fractional condensation and fractional distillation, using rectifying columns to assist the separations, and heat interchangers to conserve power. When working with natural gas, ethane, propane, and butane will each be obtained in substantially pure form and stored in a holder ready to be conducted to its particular heating apparatus. A lower boiling fraction composed chiefly of methane will also be obtained, and this fraction, after using it to cool warmer gases, will be returned to the gas main or used to heat the conversion furnaces or furnish power for the plant.

The products from the conversion furnaces will be cooled, mixed, and the various constitutents separated by a similar series of steps. Since various olefines are now present, the boiling points of the constituents approach each other more closely, and the separation requires certain refinements not necessary when separating the untreated gas. In general, the reaction products will first be separated into four main fractions, one containing hydrogen, methane and carbon monoxide, a second containing ethane and ethylene, a third containing propane and propylene and a fourth containing butane and butylene. The first named fraction may be used without further treatment for any of the purposes mentioned in connection with the methane fraction from the untreated gas. The three higher-boiling fractions will each be subjected to a special rectification to separate the olefine from the paraffin, and the latter will be returned to the appropriate gas-holder.

In making any of the separations mentioned above, to obtain constituents of either the untreated gas or the products obtained by heating, the following method of operation may be applied with great advantage. Suppose that ethane and propane occur in a mixture and are to be separated. If the mixture is placed under sufficient pressure and the temperature then reduced, a point will be reached where condensation will take place and both constituents may be liquefied. The mixture is now at its boiling point under the pressure in the vessel, and any diminution of this pressure will result in the vaporization of ethane, the lower boiling constituent. A clean separation cannot, however, be brought about in this way, for the boiling ethane always carries off propane with it. It has been found that if the cooling is carried not only to the point of liquefaction but much below it, that is, to a point where propane has no appreciable vapor tension, and the sub-cooled mixture is then caused to flow down through a rectifying tower where it comes into regions of progressively higher temperature, the ethane and propane may be separated in substantially pure form. This principle of sub-cooling a liquid mixture of hydrocarbons before fractionating it has frequent application in the process hereinafter described and greatly facilitates the desired separations.

Figure 2B:
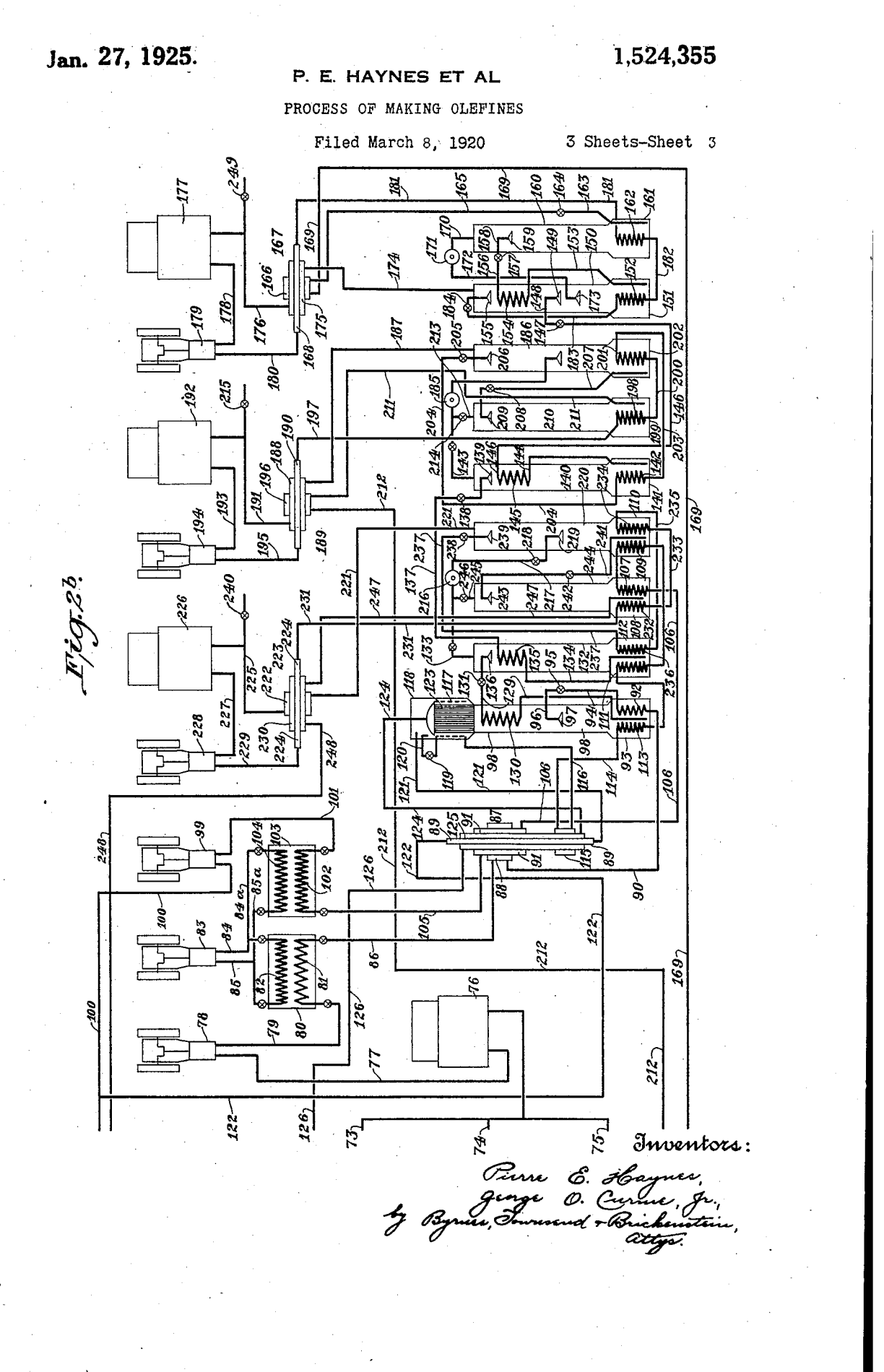

To further illustrate our process, reference is made to the accompanying drawings in which Figure 1 shows curves illustrating the behavior of paraffin gases on heating and Figure 2 shows diagrammatically a complete apparatus for separating a gas, such as natural gas, into its several hydrocarbon constituents, separately heat-treating these individual hydrocarbons, combining the reaction products, isolating olefines from the mixture so obtained, isolating paraffins from the mixture, and returning the paraffins to the appropriate furnaces for further heating.

Figure 1 illustrates the behavior of ethane, propane and butane on heating them to temperatures between 300° C. and 900° C. It is assumed that exactly the same apparatus was used in treating each gas and that the rate of flow of the gases through the furnace was the same. The abscissæ of the curve represent temperatures while the ordinates represent percentage of olefines in the mixture leaving the furnace. The maximum value for the ordinates which is 50, is never attained in practice. It will be seen that the ethane curve reaches its maximum at a higher temperature than does the propane curve, and the propane maximum is at a higher temperature than that for butane. The numerical values for temperature and degree of conversion are not given, as these vary with different forms of apparatus and different rates of gas flow. By varying these factors, the shapes of the severel curves will be modified but the maxima will always occur at different temperatures. It will be readily apparent that no single temperature is optimum for more than a single paraffin, if other conditions are constant.

In Figure 2, the left-hand portion shows the separation into its constituents of the untreated gas while the right-hand portion shows the separation of the mixture obtained by combining the reaction products from the several heating furnaces. The latter are shown toward the middle of the figure. The process as applied to a natural gas of usual composition is as follows:

Gas is drawn from the main 1 through pipe 2 and compressed by pump 3. A preliminary purifier may be interposed between the main and the pump. The gas is passed at a pressure of approximately 1000 pounds per square inch through pipes 4 or 4ª to coils 5 or 5ª in a precooler 6 or 6ª which is cooled by a suitable refrigerant, such as ammonia, carbon dioxid, butane, propane or ethane, passed through pipes 9 and 10 to coils 7 or 7ª by a compressor 8. The coils 5 and 5ª are provided with drains 11 and 11ª for the withdrawal of any substances liquefied at this stage, such a butane, pentane and hexane. Any liquid formed collects in vessel 12. Since the pressure in vessel 12 is lower than that in drains 11 and 11ª, vapors of butane and possibly some dissolved propane may be given off. These may be returned to the inlet of compressor 3 through pipe 13 and by recirculation allowed to concentrate in the system until a test of the vapors in vessel 12 shows a high percentage of butane, whereupon a portion of the vapors from vessel 12 is sent through pipe 14 to butane-gasometer 15.

From coils 5 or 5ª in precoolers 6 or 6ª, the compressed and cooled natural gas passes through pipes 16 or 16ª to pipe 17 which leads to passage 18 of the heat exchanger. Here it is cooled by cold low-pressure gases passing counter-current in passages 19, 20 and 21. From passage 18, the cold compressed natural gas passes through pipe 22 to coil 23 in kettle 24 and thence to coil 25 in kettle 26, where it is surrounded by cooler liquids. The gas in coils 23 and 25 is thus cooled while the liquids in kettles 24 and 26 are boiled and purified. From coil 25, the gas passes through pipe 27 to passage 28 of the heat exchanger, where it is further cooled. The gas then passes through pipe 29 to expansion valve 30 where it is cooled by expansion and partially liquefied. The mixture of liquid and vapor passes onward through pipe 31 and falls into column 32, where rectification takes place due to evaporation from vessel 26. A separation takes place whereby the gas issuing from the top of the column 32 is practically pure methane, the temperature at this point being controlled by the ratio of the pressure of the unexpanded gas to the pressure of the expanded gas.

From the top of column 32, the methane passes through pipe 33 to passage 21 of the heat exchanger, where it cools warm high pressure gas passing counter-current in sections 18 and 28. From passage 21 the methane, now at approximately atmospheric temperature, passes through pipe 34 to gasometer, 35, where it is stored. It may be withdrawn through pipe 36 for fuel or for return to the main by means of compressor 37.

The liquid falling into column 32 is rectified and a portion collects in vessel 26 which contains all the constituents of the gas except methane. Methane may be present in small amounts as an impurity. This liquid is withdrawn from vessel 26 through pipe 38 and coil 39 and passes into the top of a second rectifying column 40 where it is further rectified. The liquid passing through coil 39 is considerably subcooled by the colder liquid flowing over the exterior of the coil. The vapor passing from the top of the column 40 is practically pure ethane and is withdrawn through pipe 41 and passage 20 of the heat exchanger, where it cools gas in passage 18 and is itself heated. From the heat exchanger, the ethane passes through pipe 42 and 43 to gasometer 44.

The liquid collecting in vessel 24 is withdrawn through pipe 45 and coil 46 to column 47. In passing through coil 46, the liquid is cooled by the colder liquid flowing over the exterior of the coil. The vapors arising from column 47 are practically pure propane and pass through pipe 48 to passage 19 of the heat exchanger, where they cool gas in passage 18 and are reciprocally heated. Leaving the heat exchanger by pipe 49, the propane passes to gasometer 50.

The liquid collecting in vessel 51, which is practically pure butane, is withdrawn through pipe 52 and added to the liquid in vessel 53. The vapors from vessel 53 containing the propane impurity from the butane are withdrawn through pipe 54 to gasometer 15, from which they are drawn through pipe 55 by compressor 56 and raised to a pressure not exceeding 100 pounds per square inch. The compressed gas is passed through pipe 57 to coil 58 of vessel 51 where a heat exchange takes place, resulting in a partial or complete liquefaction of the gas in coil 58 and a boiling of the liquid in vessel 51. From valve 59 the gas or liquid passes through pipe 60 to column 47. The gaseous portion arises in the column and the more easily condensed vapors fall back due to the cooling action of the liquid from pipe 45. The uncondensed portion is added to the vapors passing out through pipe 48. The liquid issuing from pipe 60 or subsequently condensed in column 47 is added to the liquid in vessel 51.

A supply of ethane is now contained in gasometer 44, propane is stored in gasometer 50 and butane is contained in vessel 53. These hydrocarbons are now led to the tubes 61, 62 and 63, which are heated in the furnaces 64, 65 and 66 to the respective optimum temperatures for the several hydrocarbons. The heating of the tubes may be effected in any convenient manner but the waste methane and hydrogen obtained in the process are preferably used. The ethane is passed directly to heating tube 61 by means of pipe 67 and blower 68. The propane likewise is fed to its furnace by pipe 69 and blower 70. The liquid in vessel 53 which, as already indicated, is substantially pure butane, is withdrawn through coil 71 for evaporation and passed by blower 72 to heating tube 63.

The most favorable pressure for the heat-treating operation appears to be slightly in excess of atmospheric. It its known that pressures lower than atmospheric pressures give a greater olefine yield and less products of benzene, toluene, etc. This advantage appears to be offset however, by the disadvantage due to the leakage of air into the apparatus when maintained under a pressure less than atmospheric. Such air leakage involves the formation of explosive mixtures at temperatures above their temperature of ignition. The material of the containing walls with which the gases come in contact during the heat treatment is important, in that it should have no injurious catalytic effect on the olefines formed. Thus, when certain metals, such as iron, nickel or platinum are used, an effect is observed which results in partial destruction of the olefines. We find, however, that copper, porcelain, and the common vitreous materials do not have the property of acting injuriously at the temperatures named. The method of heating the paraffins is not in general, important, but in this process the availability of the combustible gaseous by-products or mixture of by-products makes the latter a convenient source of heat. It is recognized, however, that some advantage is to be had in electrically heating reaction tubes on account of the ease afforded for temperature control, and the possibility of more thorough heat insulation.

From the tubes 61, 62 and 63, the products obtained by the heat-treatments are conducted through pipes 73, 74 and 75 and united in gasometer 76. The mixture contains hydrogen, methane, ethylene, ethane, propylene, propane, butylene, and butane, and owing to the side reactions already referred to, toluene, benzene, naphthalene and other aromatic compounds are also present. The mixture may also contain carbon monoxid formed by the decomposition of water which was not completely removed from the natural gas. In the second stage of the process the individual olefines are isolated from the mixture as the final products, ethane, propane and butane are isolated and returned to the heating step, and all other gases are separated and disposed of in an appropriate manner. The separation is effected by the following operations.

The gas mixture is withdrawn through pipe 77 to compressor 78 where it is raised to a pressure not exceeding 500 pounds per square inch. From compressor 78 the gas is forced through pipe 79 to precooler 80, where it is cooled in coil 81 by any suitable refrigerant in coil 82. The refrigerant is circulated by compressor 83 through pipes 84 and 85. Precooler 80 is provided in duplicate for use in case one of the units should be clogged or choked by freezing. Precooler 80 serves to remove by condensation or freezing practically all of the deleterious impurities previously mentioned, such as benzene, toluene, naphthalene, tar, water, etc. From coil 81 the gas is forced through pipe 86 to the passage 88 of the heat exchanger 87 where it passes in countercurrent heat-exchanging relation with colder gases in section 91.

From heat exchanger 87 the gas is forced through pipe 90 to coil 92 of kettle 93 where it is cooled by liquid previously formed and boiling in kettle 93. From coil 92 the cooled compressed gas is withdrawn through pipe 94 to expansion valve 95 where it is expanded to a pressure less than 100 lbs. per sq. in. and partially liquefied. From expansion valve 95 the mixture of liquid and gases passes through pipe 96 to opening 97 into rectifying column 98. The liquid falls through column 98 into kettle 93 where it bathes coil 92.

Methane collected in holder 35 is withdrawn by compressor 99 through pipe 100 and is raised to a pressure not exceeding 2500 lbs. per sq. in. and preferably around 1000 lbs. per sq. in. The compressed gas is forced through pipe 101 to coil 102 of precooler 103 where it is cooled by a suitable refrigerant circulated by compressor 83 through 84ª and 85ª. A duplicate of precooler 103 is provided for use in case one of the units should be clogged or choked by freezing. From coil 102 the compressed methane is forced into pipe 105 to section 91 of heat exchanger 87 where it is cooled by cold expanded gases passing countercurrent in sections 89 and 125. From sections 91 the methane is forced through pipe 106, coil 107 in kettle 108, coil 109 in kettle 110, coil 111 in kettle 112, and coil 113 in kettle 93, which latter coil is bathed in cold liquid previously formed and surrounding coil 92 also. From coil 113 the cold compressed methane is forced through pipe 114 to section 115 of heat exchanger 87 where it is further cooled by cold gases passing countercurrent in section 89. From section 115 it is forced through pipe 116 to coil 117 in vessel 118, coil 117 being bathed in cold liquid methane previously formed, and the methane then passes to expansion valve 119 where it is expanded to a lower pressure and partially liquefied. The mixture of gas and liquid formed at expansion valve 119 passes through pipe 120 and the liquid portion falls into vessel 118 where it surrounds coil 117. The gaseous portion issuing from pipe 120 enters vessel 118 and emerges therefrom through pipe 121 and passes to section 89 of heat exchanger 87 where it cools warm compressed gases passing countercurrent in sections 88, 91 and 115. From section 89 the methane now at low pressure passes into pipe 122 which connects with pipe 100. From pipe 100 the methane is recirculated by compressor 99 as previously described.

The cold methane in vessel 118 bathes condenser tubes 123. The liquid contained in vessel 93 is boiled by the warm gases in coils 92 and 113. The vapors rising from vessel 93 pass into rectifying column 98 where they mingle with the uncondensed portion of the gas issuing from orifice 97. This latter mixture passes up through column 98 into condenser tubes 123 where it is cooled to the temperature of boiling methane. All portions of the gaseous mixture arising in tubes 123 except hydrogen, methane and carbon monoxid are recondensed and fall back into column 98. The hydrogen, methane, and carbon monoxid emerge from condenser 123 through pipe 124 to section 125 of heat exchanger 87 where they serve to cool warm compressed gas passing countercurrent in 88 and 91. From section 125 of heat exchanger 87, the gas passes to pipe 126 which connects with gasometer 127, whence it may be withdrawn through pipe 128 for use as a fuel gas in furnaces 64, 65 and 66 or return to the natural gas main by means of compressor 37.

The cold liquids dropping into the column from condenser tubes 123 pass down column 98 and are rectified by contact with warm vapors arising through column 98. The rectified liquid collecting in vessel 93 is withdrawn through pipe 129 and coil 130 to valve 131. In coil 130 the liquid is cooled because of the contact of the outer side of the coil with cold liquids dropping from condenser tubes 123. The liquid arriving at expansion valve 131 is cooled to considerably below its boiling point, and is passed into column 132 and falls down said column collecting in vessel 112 where it bathes coil 111 and is boiled by the warmer gas passing through coil 111. The vapors arising from vessel 112 rise through column 132 and emerge from column 132 through pipe 133. The liquid collecting in vessel 112 is withdrawn through pipe 134 and coil 135 which is cooled by colder liquids from valve 131 and orifice 136. The liquid in coil 135 is cooled to considerably below its boiling point and passes through pipe 137 to valve 138 and orifice 139 into column 140. The liquid falling into column 140 collects in vessel 141 and is warmed by warmer compressed gases in coil 142.

The liquid collecting in vessel 141 is boiled and the vapors arising therefrom pass through column 140 into pipe 143. The rectified liquid collecting in vessel 141 is withdrawn through pipe 144 to coil 145 where it is cooled by colder liquid issuing from orifice 139. The cooled liquid from coil 145 is led through pipe 146 to valve 147 where it is expanded to a lower pressure and passes through pipe 148 and orifice 149 into column 150. The liquid dropping into column 150 collects in vessel 151 where it is boiled by warm compressed gases in coil 152. The liquid finally collected in vessel 151 passes out through pipe 153 to coil 154 where it is cooled by colder liquid falling from orifice 155 as will be described later. Passing from coil 154 the cold liquid now passes through pipe 156 to valve 157 where it is expanded to a low pressure and passes through pipe 158 to orifice 159. The liquid issuing from orifice 159 falls into column 160 and collects in vessel 161 where it is boiled by warmer compressed gases in coil 162. The liquid finally collected in vessel 162 is withdrawn through pipe 163 and valve 164 through pipe 165 to section 166 of heat exchanger 167 where it is warmed by warm compressed gases in section 168. The vapors passing through section 166 of heat exchanger 167 are composed of butane with any of the liquid impurities of the original gaseous mixture of higher boiling points than butane. These may be withdrawn and passed through pipe 169 and returned to butane tank 53.

The uncondensed vapors passing out of column 160 pass through pipe 170 and are drawn by pump 171 and raised to a slightly higher pressure in pipe 172. From pipe 172 the vapors pass through orifice 173 to column 150. Rising in column 150 they are cooled and partially condensed by cold liquid issuing from orifice 155. The uncondensed portion passes out of column 150 through pipe 174 to section 175 of heat exchanger 167 where it is warmed by high pressure gas passing countercurrent in section 168. From section 175 the warm vapors pass through pipe 176 to gasometer 177, whence they are drawn through pipe 178 by compressor 179 and compressed in pipe 180. The compressed gas from 180 passes into section 168 where it is cooled by low pressure cold gases or vapors passing countercurrent in sections 175 and 166 of heat exchanger 167. From section 168 the cold compressed vapor passes through pipe 181 to coil 162 in vessel 161, where it serves by exchange of heat to boil the liquid in vessel 161. From coil 162 the cooled and compressed gas passes through pipe 182 to coil 152 in vessel 151, where by exchange of heat it serves to boil the liquid collected in vessel 151. From coil 152 the cold gas now passes through pipe 183 to expansion valve 184 where it is expanded to a lower pressure and partially liquefied. It falls through orifice 155 into column 150 washing coil 154 and cooling the gases arising from orifices 149 and 173 in column 150.

The liquid passing through valve 147 has butylene for its constituent of highest boiling point. By recirculation of the liquid emerging from column 150 into pipe 174 the constituent of highest boiling point is concentrated and finally the gas passing out through pipe 174 is pure butylene. This gas following the path previously mentioned is collected in gasometer 177 where it is held for recirculation or it may be withdrawn through valve 249 for any other purpose.

The mixture of vapors emerging from column 160 into pipe 170 is composed of butane and butylene and is added through pipe 170, pump 171, and pipe 172 to column 150 where it is treated further for the separation of the butylene from the butane.

The vapors rising in column 140 pass out through pipe 143 through pump 185 into column 186. Rising in column 186 the vapors pass out through pipe 187 to section 188 of heat exchanger 189 where they are warmed by high pressure gases passing countercurrent in pipe 190. Emerging from section 188 the gas passes through pipe 191 to gasometer 192. From gasometer 192 it is withdrawn through pipe 193 by compressor 194 and its pressure is raised to not to exceed 200 lbs. per sq. in. The gas is then forced through pipe 195 and section 190 of heat exchanger 189 where it is cooled by colder low pressure gases passing countercurrent in sections 188 and 196. Emerging from section 190 the cold compressed gas now passes through pipe 197 to coil 198 in kettle 199 and from thence through pipe 200 to coil 201 in vessel 202. From coil 201, the gas is passed through pipe 203 to coil 142 in vessel 141. Here it is cooled by liquid falling in column 140 and collecting in vessel 141, which liquid is reciprocally heated and boiled. From coil 142 the cooled and compressed gas passes now through pipe 204 to expansion valve 205 where it is expanded to a lower pressure and partially liquefied. It emerges through orifice 206 into column 186. Falling through column 186 the cold liquid lixiviates the vapors arising through column 186 and the unevaporated portion of the liquid falling through column 186 is finally collected in vessel 202. From vessel 202 this liquid is withdrawn through pipe 207 to expansion valve 208 and orifice 209 and falls through column 210 collecting in vessel 199 around coil 198.

The gas in coil 198 is warmer than the liquid collecting around it and the latter is therefore, boiled and partially evaporated. Since the constituent of highest boiling point emerging from column 140 through pipe 143 is propane, this constituent will be concentrated in vessel 199 to a state of practical purity and may be withdrawn through pipe 211 to section 196 of heat exchanger 189 and from thence to pipe 212 through which it passes to propane holder 50. The vapors arising through column 210 are a mixture of propane and propylene and are lixiviated by the liquid falling from orifice 209. A mixture finally emerges from column 210 through pipe 213 and valve 214 which is added to the vapors passing in pipe 143 to pump 185 and recirculated to column 186 for further separation of the propane and propylene in the mixture.

Since the substance of lowest boiling point issuing as a vapor through pipe 143 is propylene, the recirculation of this mixture from pipe 187 through the heat exchanger and gasometer by compressor 194 and return to the system through valve 205 and orifice 206 will finally concentrate propylene to a state of practical purity. This substance is collected in gasometer 192 where it is held for recirculation or it may be withdrawn through valve 215 for any other use.

The vapors issuing through pipe 133 from column 132 contain a mixture of ethane and ethylene practically free from all other constituents of the original mixture. This mixture is drawn through pipe 133 to pump 216 where its pressure is increased very slightly and it is passed through pipe 217 and valve 218 to orifice 219 in column 220. Rising in column 220 it emerges therefrom through pipe 221 and passes to section 222 of heat exchanger 223 where it is warmed by warm high pressure gas passing countercurrent in section 224. Emerging from section 222 the gas is passed through pipe 225 to gasometer 226. From gasometer 226 the gas is drawn through pipe 227 by compressor 228 and raised to a pressure not to exceed 750 lbs. per sq. in. in pipe 229. From pipe 229 the compressed gas passes to section 224 of heat exchanger 223 where it is cooled by cold low pressure gas passing countercurrent in sections 222 and 230. The cold compressed gas emerges from section 224 into pipe 231 and passes through coil 232 in vessel 108 coil 232 being bathed and the gas partially cooled by the liquid in vessel 108 previously described. Passing from coil 232 the gas emerges through pipe 233 and passes through coil 234 in vessel 110 and from thence through pipe 235 to coil 236 and pipe 237. Through pipe 237 the gas passes to expansion valve 238 where it is expanded to a lower pressure and partially liquefied. The mixture of liquid and vapor emerges from orifice 239 and liquid falls into column 220 and collects in vessel 110 immersing coils 109 and 234, being heated and boiled thereby. The vapors arising through column 220 are lixiviated by the liquid emerging from orifice 239. Since the constituent of lowest boiling point passing out through pipe 133 is ethylene, this constituent will be concentrated at the top of column 220 and after a slight recirculation the gas issuing through pipe 221 will be ethylene of practical purity and may be withdrawn from the system as desired through valve 240.

The liquid collecting in vessel 110 is a mixture of ethylene and ethane and is withdrawn through pipe 241 and valve 242 to orifice 243 from which it emerges and falls into column 244. Falling into column 244 it passes into vessel 108 where it immerses coils 107 and 232 which are warmer. An exchange of heat takes place and the gases in coils 107 and 232 are cooled while the liquid in vessel 108 is boiled. The vapors arising from vessel 108 and through column 244 are lixiviated by the liquid from orifice 243 and pass out through pipe 245 and valve 246 to pipe 133 where they are mingled with the gas in pipe 133 passing to pump 216. The liquid collecting in 108 is boiled and rectified until it becomes practically pure ethane and is withdrawn through pipe 247 to section 230 of heat exchanger 223 and emerges therefrom through pipe 248 and passes to the inlet of the ethane gasometer 44.

It will be understood that in many cases it will not be necessary to resort to a complete separation of all products. For example, a mixture containing ethylene and ethane but substantially free from other substances might be desired, in which case the fraction containing these constituents, and obtained as already described, would not be further separated. When dealing with certain gas mixtures, it may be advisable to amplify or multiply some of the steps, but the example given will be sufficient to illustrate the underlying principles, and to indicate variations which may be desirable under special conditions.

The invention is not limited to the sequence of steps described above, which are for illustration only, nor to the apparatus disclosed, which is susceptible of many modifications. The scope of the invention is only limited by the appended claims in which latter, the specific designation of certain constituents of a gas-mixture is not intended to limit the constituents present to those enumerated.

What we claim is:

1. A process of treating hydrocarbon mixtures containing paraffin hydrocarbons of higher molecular weight than methane, which comprises isolating a plurality of said paraffin hydrocarbons in a state of substantial purity; heat-treating each hydrocarbon so isolated under substantially the optimum conditions for the production of olefines therefrom; combining the products of the heat-treatments; isolating from the mixture at least one of the paraffin hydrocarbons originally heat-treated; and returning it to the heat-treating process.

2. A process which comprises separately heat-treating a plurality of homologues of methane having higher molecular weights than methane under conditions adapted for the production of olefines therefrom; combining the resulting gaseous products; isolating from the mixture so obtained at least one of the hydrocarbons originally heat-treated; and returning said hydrocarbon to the heat-treating process.

3. A process which comprises separately heat-treating ethane and propane under conditions adapted for the production of olefines therefrom, combining the resulting gaseous products, isolating ethane and propane respectively from the mixture so obtained, and returning the ethane and propane so obtained to the heat-treating process.

In testimony whereof, we affix our signatures.

PIERRE E. HAYNES.
GEORGE O. CURME, Jr.